(12) United States Patent
Kim et al.

(10) Patent No.: US 9,355,170 B2
(45) Date of Patent: May 31, 2016

(54) CAUSAL TOPIC MINER

(71) Applicant: Hewlett-Packard Development Company, L.P., Houston, TX (US)

(72) Inventors: Hyun Duk Kim, Champaign, IL (US); ChenXiang Zhai, Champaign, IL (US); Meichun Hsu, Los Alto Hills, CA (US); Maria Guadalupe Castellanos, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 145 days.

(21) Appl. No.: 13/686,297

(22) Filed: Nov. 27, 2012

(65) Prior Publication Data
US 2014/0149417 A1    May 29, 2014

(51) Int. Cl.
*G06F 17/30* (2006.01)

(52) U.S. Cl.
CPC .... *G06F 17/30699* (2013.01); *G06F 17/30551* (2013.01); *G06F 17/30598* (2013.01)

(58) Field of Classification Search
CPC ..................... G06F 17/30598; G06F 17/30551
USPC .................................................. 707/725, 740
See application file for complete search history.

(56) References Cited

U.S. PATENT DOCUMENTS

| | | | | |
|---|---|---|---|---|
| 6,052,657 | A * | 4/2000 | Yamron | G06F 17/30616 704/257 |
| 6,185,531 | B1 * | 2/2001 | Schwartz | G06F 17/271 704/236 |
| 6,772,120 | B1 * | 8/2004 | Moreno | G06F 17/2715 704/256 |
| 7,200,584 | B2 * | 4/2007 | Sakurai | G06N 7/02 706/46 |
| 7,529,790 | B1 * | 5/2009 | Sayal | G06F 17/18 708/422 |
| 7,570,262 | B2 * | 8/2009 | Landau et al. | 345/440 |
| 7,853,465 | B2 * | 12/2010 | Molesky | G06F 17/30551 705/7.11 |
| 8,533,195 | B2 * | 9/2013 | Xu | G06F 17/16 707/738 |
| 8,539,106 | B2 * | 9/2013 | Shah | G06F 17/30026 700/94 |
| 8,781,989 | B2 * | 7/2014 | Duchon | G06F 17/30705 706/52 |
| 2003/0004692 | A1 * | 1/2003 | Srivastava | G06F 17/16 702/189 |
| 2004/0027349 | A1 * | 2/2004 | Landau | G06F 17/30572 345/440 |
| 2005/0283337 | A1 * | 12/2005 | Sayal | G06Q 10/00 702/179 |
| 2006/0167825 | A1 * | 7/2006 | Sayal | G06N 5/022 706/45 |
| 2007/0225968 | A1 | 9/2007 | Murakami et al. | |
| 2008/0222109 | A1 * | 9/2008 | Sakurai | G06K 9/00496 |
| 2009/0018994 | A1 * | 1/2009 | Hajdukiewicz | G06F 17/30551 |

(Continued)

FOREIGN PATENT DOCUMENTS

WO    WO2007147166    12/2007

OTHER PUBLICATIONS

Han, et al., "Mining Object, Spatial, Multimedia, Text, and Web Data," Data Mining: Concepts and Techniques, Second Edition, Dec. 8, 2006, pp. 591-648.

(Continued)

*Primary Examiner* — Thu-Nguyet Le
*Assistant Examiner* — Nargis Sultana
(74) *Attorney, Agent, or Firm* — Michael A. Dryja

(57) ABSTRACT

Causal topic mining can include incorporating non-text time series data with a number of articles based on a time relationship and analyzing the incorporated non-text time series data and the number of articles at a particular time to determine a causal relationship.

14 Claims, 4 Drawing Sheets

(56) References Cited

U.S. PATENT DOCUMENTS

| | | | | |
|---|---|---|---|---|
| 2010/0280985 | A1* | 11/2010 | Duchon | G06Q 10/10 706/52 |
| 2010/0318526 | A1 | 12/2010 | Nakazawa et al. | |
| 2011/0202484 | A1* | 8/2011 | Anerousis | G06N 7/005 706/12 |
| 2011/0283099 | A1* | 11/2011 | Nath | H04L 9/008 713/150 |
| 2012/0101965 | A1* | 4/2012 | Hennig | G06N 7/005 706/12 |
| 2012/0117079 | A1* | 5/2012 | Baum | G06F 17/30551 707/746 |
| 2012/0215523 | A1* | 8/2012 | Inagaki | G06F 17/30705 704/9 |
| 2014/0108372 | A1* | 4/2014 | Oh | G06F 17/3089 707/706 |

OTHER PUBLICATIONS

Cook, et al., "An Urban Allocation Model Combining Time Series and Analytic Hierarchical Methods," A Journal of the Institute for Operations Research and the Management Sciences, vol. 30, No. 2, Feb. 1984, pp. 198-208.

Kim, et al., "InCaToMi: Integrative Causal Topic Miner Between Textual and Non-textual Time Series Data," 21st ACM International Conference on Information and Knowledge Management (CIKM 2012), Oct. 29-Nov. 2, 2012, Maui, HI, USA, 3 pages.

* cited by examiner

CAUSAL TOPIC MINER

BACKGROUND

Databases can include a variety of text articles. The text articles can include a variety of words. The variety of words can be used to categorize the text articles into a number of topics.

DETAILED DESCRIPTION

Topic modeling techniques (e.g., probabilistic latent semantic analysis (PLSA), latent Dirichlet analysis (LDA), etc.) can use word co-occurrences to create topics that include various articles. The articles can each include a timestamp that indicates a time that relates to the article (e.g., date the article was published, time the article was posted online, etc.). The timestamps can be utilized to create a timeline of the articles within each topic.

Time series data (e.g., non-text time series data, etc.) can include numerical data with a corresponding timeline. For example, time series data can include historic stock prices with a corresponding timeline of the stock prices. The time series data can be incorporated into the topics to determine topics that have a causal relationship to the time series data. For example, the time of particular changes in the numerical values of the time series data can be compared to the time of particular articles within each topic to determine if a causal relationship (e.g., the date of a change in numerical values corresponding to the date of articles within a particular topic, etc.) exists between the particular numerical changes and the particular articles.

The causal relationship between the time series data and the number of topics can include correlations between articles and/or words within the topics and the time series data. For example, the causal relationship can include topics that correspond to a change in the numerical values of the time series data. In this example the causal relationship can be articles that correspond to increases in stock market prices. The timestamps of the articles within the topics can correspond to the time the increase in stock market prices occurred. The causal relationship can be used to analyze and understand a number of reasons for changes in the non-text time series data. For example, a user can find an incident which causes a particular company's stock price to change. In addition, the causal relationship can also be used to predict future changes to the numerical values of the time series data after a release of articles that would be categorized within a particular topic.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of articles" can refer to one or more articles.

Figure 1:
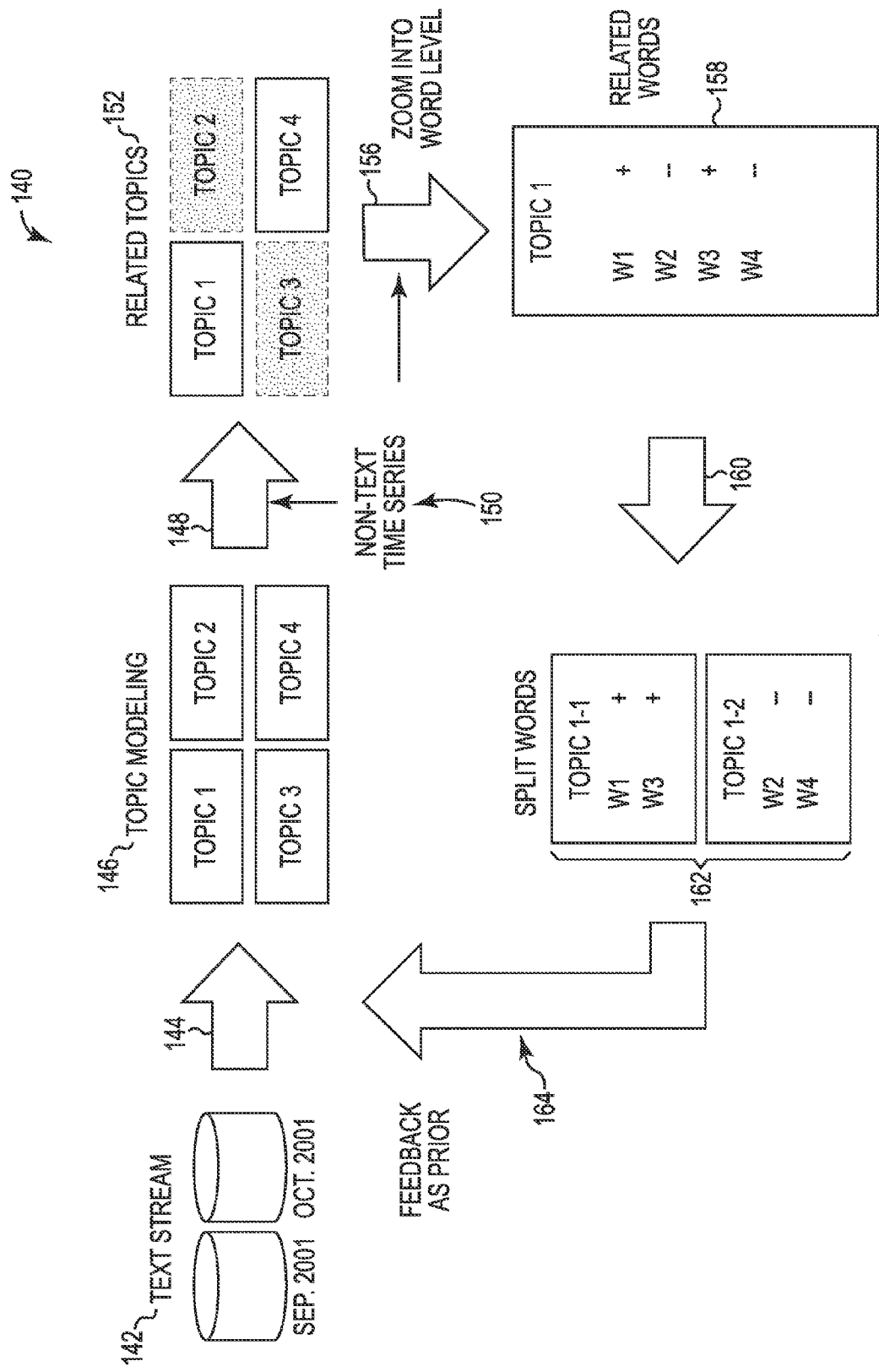
FIG. 1 illustrates a flow diagram for an example of causal topic mining according to the present disclosure.

FIG. 1 illustrates a flow diagram 140 for an example of causal topic mining according to the present disclosure. Causal topic mining can include the determination of a causal relationship between a number of articles (e.g., text data, news articles, Internet articles, etc.) that are organized in a text stream (e.g., text stream 142, etc.) and non-text time series data (e.g., stock prices, election polls, etc.). The causal relationship can include a number of words and/or phrases from the number of articles that cause a particular change in the time series data. For example, the particular change can include an increase and/or decrease in numerical values within the time series data.

The text stream 142 can include various text articles within a particular time period (e.g., Sep. 1, 2001 through Oct. 31, 2001, etc.). The text stream 142 can be organized in chronological order based on a timeline to create a timeline of the various text articles.

The text stream can be input into a topic modeling module at arrow 144. The topic modeling module can execute instructions to perform techniques such as, PLSA and LDA, among other topic modeling techniques. The topic modeling techniques can use word co-occurrences to generate a number of topics 146 (e.g., Topic 1, Topic 2, etc.) from the text stream (e.g., input document collection, etc.). The number of topics 146 can be defined as a number of words with a corresponding probability for each word. For example, a particular topic with the number of topics 146 can relate to social security tax and the particular topic can include words with a corresponding probability (e.g., Topic 1={social: 0.5, security: 0.3, tax: 0.2, etc.). That is, the number of topics 146 can be represented by a multinomial distribution of words, usually based on a unigram language model.

A probability for each article can also be calculated for each topic. For example, a particular article can have a probability of 0.3 for Topic 1 and the particular article can have a probability of 0.7 for Topic 2. In this example, the particular article can be assigned and/or designated to Topic 2, since it has a higher probability compared to Topic 1. From the number of topics 146 (e.g., words with corresponding probability, etc.), a likelihood of each article to each topic can be calculated. For example, a particular article relating to social security can have a relatively high likelihood to a topic relating to social security tax compared to topics relating to other topics.

A soft assignment value can also be used to designate a particular article to a particular topic. For example, a particular article can have a 0.3 probability for topic 1 and a 0.7 probability for topic 2. In this example, a topic time series can be generated based on an article to topic probability. The topic time series can be generated by determining a quantity of articles relating to each topic per a time unit (e.g., day, hour, etc.). The topic time series can be used to assign the soft assignment value to each article. The soft assignment value can be used as a weighted value for designating articles to a particular topic.

Each of the number of topics 146 can be incorporated with non-text time series data 150 at 148 to generate a number of related topics 152. The number of related topics 152 can be generated by a causal analysis. The causal analysis (e.g., Granger test, Pearson correlation, etc.) can be a method to determine a relationship (e.g., time relationship, etc.) between the number of words within each of the topics and a change in a numerical value of the non-text time series data 150 over a particular period of time. The time relationship between the number of words and a change in the numerical value of the non-text time series data 150 can be a causal relationship. The time relationship can be determined by comparing a timeline of the non-text time series data to each topic time series.

The causal relationship (e.g., time relationship of a particular increase and/or decrease in a numerical value, etc.) can give a significance value (e.g., p-value, etc.) for the correlation between the topic time series and the change in the numerical value of the non-text time series data 150. For example, Topic 1 and Topic 4 can have a higher significance value compared to Topic 2 and Topic 3 from the related topics 152. Related topics 152 can be selected topics that have a higher significance than a significance cutoff (e.g. larger than 90% significance) in causal relationship. For example, Topic 1 and Topic 4 from the related topics 152 can have 93% and 97% significance value and be selected as related topics 152. In addition, the significance values of Topic 2 and Topic 3 can be lower than 90% and not selected as related topics 152.

The selected related topics 152 (e.g., Topic 1 and Topic 4, etc.) can be further analyzed to determine a relatedness of each word within the selected related topics 152. For example, for each word a word time series (e.g., word frequency over a period of time) can be determined by determining a quantity of each word that appears in the topic over a particular period of time. Incorporating the non-text time series data 150 with each word time series within each of the related topics at 156 can result in a causality significance and orientation of impact (e.g., impact type, impact orientation, etc.) for each of the number of words within the related topics 152. Determining the causality significance can include using the same and/or similar technique used for incorporating the non-textual time series data and topic. Impact orientation can be determined by checking if an increase of one time series induces an increase or decrease of the other time series. For example, the positive orientation of impact can be related to an increase in a numerical value of the non-text time series data 150 at a corresponding time to the word time series within the selected related topics 152. In another example, the negative orientation can be related to a decrease in a numerical value of the non-text time series data 150 at a corresponding time to the word time series within the related topics 152. In one example, a Granger test can be used for determining a causality significance between the non-text time series data 150 and the word time series within the related topics 152. In this example, a regression coefficient can show an impact orientation. In another example, a Pearson correlation can be used to determine a sign of the correlation value. In this example, the sign of the correlation value can be the impact orientation (positive/negative).

Words within the related topics 152 can be selected for having a relatively high causality significance with the non-text time series data 150 compared to other words within the related topics 152. Related words 158 for related Topic 1 can be displayed to a user of a computing device associated with a topic modeling module. Word 1, Word 2, Word 3, and Word 4 can be represented by W1, W2, W3, W4, etc. Each word within the related words 158 can have a corresponding orientation (e.g., positive (+) and/or negative (−) result in a numerical value of the non-text time series, etc.).

The orientation can represent the corresponding words causal relationship with the non-text time series data 150. A positive orientation can be a relationship between a particular word and an increase in the numerical value of the non-text time series data. For example, W1 within the related words 158 can have a corresponding positive orientation. In this example, the corresponding positive orientation for W1 can occur in a number of articles with timestamps that relate to an increase in a numerical value of the non-text time series data 150. The negative orientation can be a relationship between a particular word and a decrease in the numerical value of the non-text time series data.

The related words 158 can be analyzed to determine a number of top related words to observe instead of observing all the words in related topics. The related words 158 can be ranked based on a probability for each of the number of words. For example, a word with a higher probability can have a higher rank compared to a different word with a lower probability. The probability can be the word occurrence within particular articles that result in the particular orientation of the topic prior.

The rank can be used to determine a number of words to use as feedback for additional iterations of topic modeling. The rank can be used to determine a fixed number of words to check, and those words will be used to generate feedback in the additional iterations. For example, it can be determined that a particular number of words (N number of words, etc.) within each topic with a highest probability can be used as feedback.

The rank can also be used with a cumulative probability mass cutoff. The cumulative probability mass cutoff can be a predetermined probability value that can be used to determine a number of words to use as feedback. For example, the predetermined probability value can be 0.5. In this example word A has a probability value of 0.3, word B has a probability value of 0.25, and word C has a probability value of 0.2, the rank would be in descending order based on the probability value. (e.g., A, B, C, etc.). In this example, since the predetermined probability value is 0.5 word A and word B would be selected for feedback, but since the probability value of word A plus word B exceeds 0.5, word C may not be selected for feedback.

Based on the related words 158 and their orientation, feedback can be generated. The feedback that is generated can helpful in modeling topics that are more related to the external non-text time series. Feedback can be implemented as a prior topic. Prior topics can be similar to the original topics as described herein (e.g., a number of words and corresponding probabilities). When topic priors are generated, the topic modeling can follow words and probability given in the topic prior. For example, a topic prior with a high probability of a particular word (e.g., security, etc.) in topic 1, an additional iteration of topic modeling using the topic prior can also tend to have high probability in the particular word (e.g., security, etc.). That is, topic prior feedback can guide additional iterations of topic modeling.

It can be advantageous to generate a topic prior feedback with a consistent impact orientation. Therefore, if positive and negative words are mixed in a single topic prior, it can be advantageous to separate the related words 158 into topic priors 162 based on orientation. Separating the related words 158 into topic priors 162 based on orientation can generate additional topics with a more consistent impact orientation (e.g., consistent positive impact, consistent negative impact, etc.) compared to a previous iteration of generating topics. For example, generating topics using related word priors that have similar orientation can result in topics with a greater relatedness and consistent impact with non-text time series data.

The related words 158 from Topic 1 can be split into a number of topic priors 162 at 160. The topic priors 162 can be a number of words within a particular topic that are grouped together based on an orientation of the number of words. For example, the topic priors 162 can include a number of positive topic priors (e.g., Topic 1-1, etc.) and a number of negative topic priors (e.g., Topic 1-2, etc.).

The probability for each of the number of words can be based on a comparison with other words within a particular topic. For example, the probability of each word within the topic can equal a predetermined total (e.g., 100%, 1.0, etc.). That is, the probability of each word within a topic can equal a total probability of a word within the topic appearing in an article.

The probability for each of the number of words can be based on a significance value above a predetermined threshold for each of the topic priors. For example, each of the topic priors can include words with a significance value above 95 percent. In this example, the probability for each word can be based on a percentage value above the significance value of 95 percent. The significance value can be a consistency of the impact a word has on the non-text time series data. For example, if a particular word has a negative impact the non-text time series in 96% of the time when the particular word appears in articles, then the significance value for the particular word can be 96%.

A number of words selected for feedback can be organized into a number of topic priors 162 as described herein. The number of topic priors 162 can be used as feedback at 164. The feedback can be a number of topic priors 162 that include a number of words that include a higher significance to the non-text time series data compared to words that were not selected. The feedback can undergo topic modeling 146 as described herein and perform an additional iteration of incorporating the non-text time series data as described herein. By performing multiple iterations of the modeling, correlation analysis and topic prior generation can result in related topics, related words, and topic priors that have an increased correlation to the non-text time series data.

Figure 2:
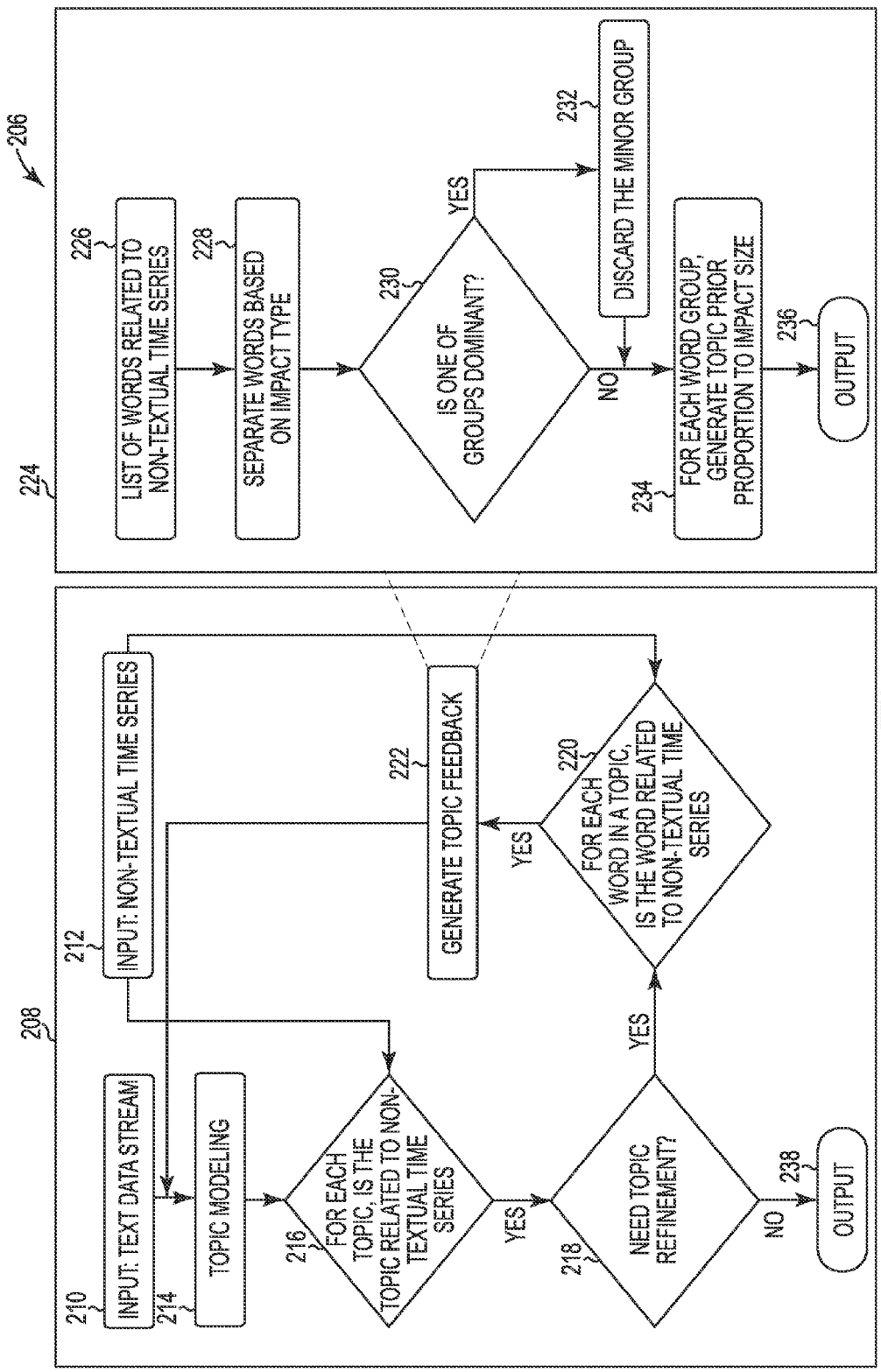
FIG. 2 illustrates a diagram for an example of causal topic mining according to the present disclosure.

FIG. 2 illustrates a flow diagram 206 for an example of causal topic mining according to the present disclosure. The flow diagram 206 can include an example of incorporating a non-text time series with articles within box 208. The flow diagram 206 can also include an example of generating topic feedback within box 224.

An example of incorporating a non-text time series with articles can be represented within box 208. A number of articles can be represented as a text data stream 210 and used as an input for a topic modeling technique 214. Non-text time series data 212 can be incorporated with a number of topics from the topic modeling at box 216.

At box 216 it is determined for each topic whether or not the topic is related to non-text time series. If it is determined that a particular topic includes a relationship (e.g., a timestamp of articles near a time with a change in numerical values of the non-text time series, etc.) with the non-text time series data, the non-text time series data can be incorporated into the topic and utilized to determine a relevancy. For example, the non-text time series data can be compared to articles within a topic that include a timestamp to determine a relevancy. The relevancy of the topic can include the co-occurrences of particular words and/or phrases within the article at a particular time that relates to the non-text time series data. The particular time can include a time that corresponds to an increase and/or decrease in the numerical value of the non-textual time series data. The particular time can also include a time that corresponds to a particular numerical value of the non-text time series data.

Determining whether or not the topic is related to non-text time series data can include determining whether the topic has a causal relationship to the non-text time series data. For example, it can be determined if articles within a topic are related to a cause of the increase and/or decrease in the numerical value of the non-text time series data. It can be determined that articles within a topic released a predetermined time before the increase and/or decrease in the numerical value of the non-text time series can be related to the cause of the increase and/or decrease. That is, the articles within the topic can be considered to have a causal relationship to the increase and/or decrease in the numerical value of the non-text time series data.

At box 218 it can be determined if the related topics from box 216 need refinement. Determining if the related topics need refinement can be based on a number of factors. The number of factors can include: a number of iterations of topic modeling, a particular impact value, an impact orientation, a significance value, etc. The significance value can be based on a quantity of co-occurrences for each word and the impact value can have a particular impact orientation (e.g., positive, negative, etc.). The quantity of co-occurrences can include a quantity of times a particular word appears within an article. The significance of each word with the non-text time series data can be a consistency that a particular word corresponds to a particular impact orientation as described herein.

If it is determined that the related topics should be refined it can be determined at box 220 which of the number of words within articles of the topics are related to the non-text time series data. The non-text time series data from box 212 can also be input to determine at box 220 which of the number of words within articles of the topics are related to the non-text time series data.

If it is determined the number of topics generated from the additional iteration of topic modeling do not need any further refinement at box 218, then causal relationship data between the topics and the non-text time series data can be output at box 238 and displayed to a user.

The number of words that are related to the non-text time series data can be used to generate feedback at box 222. The feedback can include a number of words and/or phrases that are more related to the non-text time series data compared to other words and/or phrases within the articles of the topics generated at box 222 and can be used for further topic modeling at box 214.

An example of generating topic feedback at box 222 is shown within box 224. The dashed lines connecting box 222 and box 224 can represent that box 224 can be within box 222. 3A list of words related to the non-text time series can be collected at box 226. The list of words can be separated into a number of groups based on an impact orientation and/or a significance value based on a correlation between the word and the non-text time series data at box 228. The impact orientation can include a positive and/or a negative impact orientation. For example, a category based on a positive impact can include words that correspond to an increase in a numerical value of the non-text time series data. The significance value can be the frequency of word within a topic corresponding to a particular change (e.g., increase, decrease, etc.) in the numerical value.

It can be determined at box 230 whether one of the groups can be considered a dominant group and/or minor group. A dominant group can include a number of words that include a relatively high significance value with the non-text time series data. A minor group can include a number words that include a relatively low significance with the non-text time series data. If it is determined at box 230 that a dominant and/or a minor group exists, the minor groups can be discarded at box 232. The minor groups can include words that have a relatively low significance and it can be determined that the words with low significance should not be utilized in the additional iteration of topic modeling. By not utilizing words with low significance the efficiency of the additional iterations can be increased.

After discarding any minor groups at box 232 a number of new topics can be generated at box 234. The number of new topics can be organized by an impact orientation. The impact orientation can include a cause of an increase and/or decrease to numerical values of the non-text time series data. For example, an impact orientation can include an increase to a numerical value of the non-text time series data. That is, a particular topic can include a number of words that each correspond to an increase in the numerical value of the non-text time series data.

Using an impact size (e.g., value of the numerical increase, etc.) and/or a frequency of the number of words (e.g., number of times a particular word appears in the number of articles at a particular time, etc.), a number of additional topics can be generated for an additional iteration of topic modeling and outputted at box 236. The impact size can include a value of a numerical increase. For example, the impact size can be a 10 percent increase in stock price. The outputted number of additional topics can be input into topic modeling at box 214 for an additional iteration of topic modeling as described herein using the words within the additional topics.

Figure 3:
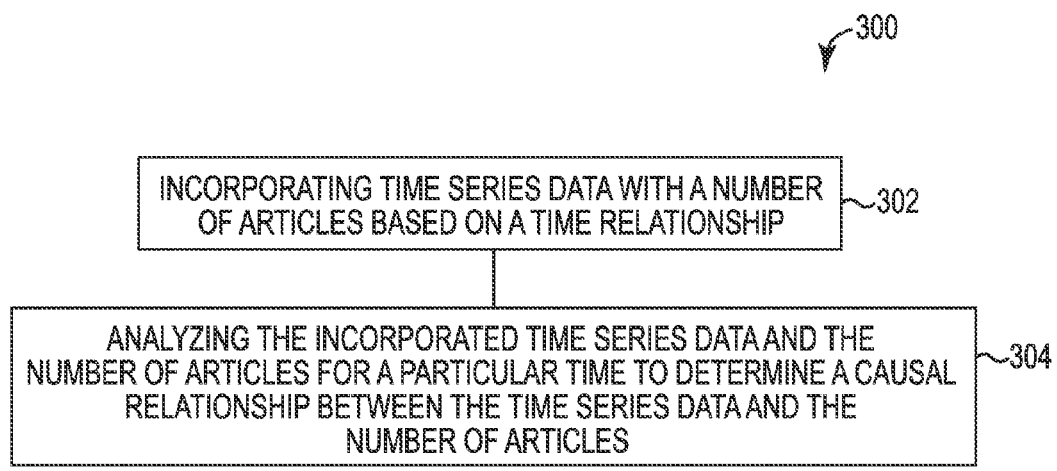
FIG. 3 illustrates a flow chart of a method for an example of causal topic mining according to the present disclosure.

FIG. 3 illustrates a flow chart of an example method 300 for causal topic mining according to the present disclosure. Causal topic mining can include incorporating non-text time series data (e.g., election poll data with a corresponding timeline, stock price data with a corresponding timeline, etc.) with a number of articles within a topic. The incorporated data can be used to determine if there is a causal relationship between text within the number of articles and changes in numerical values of the non-text time series data.

At 302, non-text time series data is incorporated with a number of articles based on a time relationship. The non-text time series data can include a number of numerical values with a corresponding timeline that relates to each numerical value of the number of numerical values. For example, the number of numerical values can include a number of stock prices. In this example, the number of stock prices can each include a timestamp and/or corresponding time.

The number of articles can include text based documents (e.g., news articles, Wikipedia articles, websites, electronic databases of text articles, etc.). Each of the number of articles can include a timestamp. The timestamp can be associated (e.g., attached, etc.) with each of the number of articles to indicate a time that relates to the article (e.g., date article was published, date article was released to public, date the article was put on a website, etc.).

The number of articles can be organized into a number of topics. The number of articles can be organized into a number of topics using various topic modeling techniques (e.g., probabilistic latent semantic analysis (PLSA), latent Dirichlet analysis (LDA), etc.). The various topic modeling techniques can use word co-occurrences to develop the number of topics. For example, a topic can be based on a number of selected words such as: social, security, and tax. In this example, the various topic modeling techniques can search for articles that include the selected words social, security, and tax. The articles that are found to include the selected words can be included in the topic.

The various topic modeling techniques can analyze various dynamics of topics using a time line that relates to the articles within each topic. The topics can be organized based on the co-occurrence of the text data within the articles and an associated time of the text data (e.g., when the article that contains the text was published, posted on a webpage, etc.). For example, a topic can be based on articles that include a number of selected words and include a timestamp within a particular time period.

At 304, the incorporated non-text time series data and the number of articles at a particular time are analyzed to determine a causal relationship. The causal relationship can be a possible cause of a change in the non-text time series data. For example, a candidate in an election can release a number of statements (e.g., article, topic, etc.) throughout an election that can cause changes in the polls (e.g., non-text time series data, etc.).

The analysis of the incorporated non-text time series data and the number of articles can be performed for a particular time. For example, the analysis can be performed for a date of Sep. 12, 2001. The particular time can include a time that is at and/or near the time of the timestamp of the number of articles and a corresponding time of the timeline of the non-text time series data. For example, the particular time can be a timestamp for a particular article that is a day before a change of the non-text time series data timeline. In this example, through an analysis it can be determined that the article has a causal relationship to the change in the non-text time series data.

The topics that are created using the various topic modeling techniques can be incorporated with non-text time series data to create a number of related topics. The number of related topics can include articles with a causal relationship to the non-text time series data. For example, the related topics can include articles that have a timestamp that relates to a time of an increase and/or decrease in the numerical value of the non-text time series data. The causal relationship can be a relationship between an increase and/or decrease in the numerical data of the non-text time series data with the number of topics. For example, a causal relationship can include articles with words relating to the release of a new product corresponding with an increase in stock prices for a producer of the product. In this example, the stock prices with a corresponding timeline can be the non-text time series data that is incorporated into the articles with words relating to the release of the product to determine what articles and words correspond to timestamps that have a potential to cause the increase in stock prices for the producer.

Each of the number of related topics can be selected to incorporate the non-text time series data with a number of words within each of the articles. Incorporating the non-text time series data with the number of words within each of the articles can determine an impact of each of the number of words. For example, the incorporated non-text time series data can display an impact that can include a number of positive impacts (e.g., increase in the non-text time series data, etc.) and/or negative impacts (e.g., decrease in the non-text time series data, etc.) within each of the number of articles.

The number of words within each article can be separated into groups based on the impact (e.g., positive and/or increase, negative and/or decrease, etc.). The groups can be used as feedback for further topic modeling. For example, the number of words within a particular group can be used for a re-evaluation of the articles with an additional number of iterations of topic modeling to determine a number of co-occurrences from the number of words within each group. The topic modeling using the number of words within each group can generate additional relevant topics between the articles and the non-text time series data. The additional relevant topics can have a greater causal relationship to the non-text time series data compared to previous related topics.

The causal relationship between the number of articles and non-text time series data can be used to predict future trends of the non-text time series data if particular articles are presented to the public (e.g., published, posted on a website, etc.). For example, if an article with a number of words and/or terms that relate to a release of a product at a particular time has a causal relationship that increases a stock price for a particular company at the particular time, then it can be predicted that a similar product release the includes the same and/or similar words within a topic can also increase the stock price for the particular company.

Figure 4:
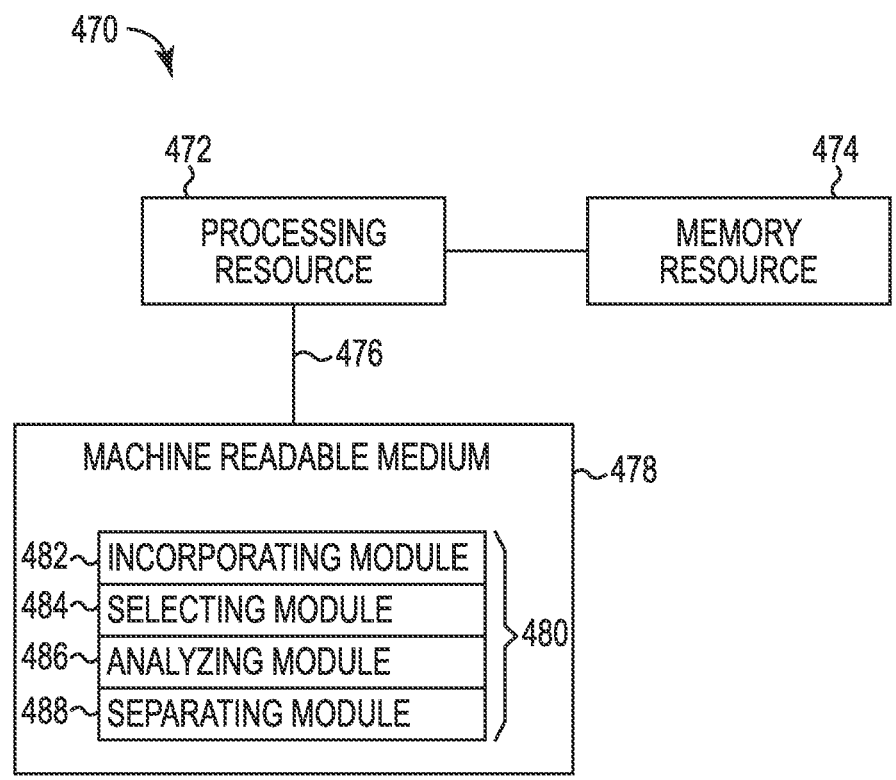
FIG. 4 illustrates a diagram of an example computing device according to the present disclosure.

FIG. 4 illustrates a diagram of an example computing device 470 according to the present disclosure. The computing device 470 can utilize software, hardware, firmware, and/or logic to incorporate non-text data with a number of articles based on a time relationship (e.g., same timestamp, occurring at a similar time, etc.).

The computing device 470 can be any combination of hardware and program instructions configured to provide a causal topic miner. The hardware, for example can include one or more processing resources 472, machine readable medium (MRM) 478 (e.g., CRM, database, etc.), and memory resources 474. The program instructions (e.g., computer-readable instructions (CRI) 480) can include instructions stored on the MRM 478 and executable by the processing resources 472 to implement a desired function (e.g., incorporate non-text time series data with articles from a number of topics based on a time relationship, separate a number of terms into a second number of topics based on the causal relationship, etc.).

MRM 478 can be in communication with a number of processing resources of more or fewer than processing resources 472. The processing resources 472 can be in communication with a tangible non-transitory MRM 478 storing a set of CRI 480 executable by the processing resources 472, as described herein. The CRI 480 can also be stored in remote memory managed by a server and represent an installation package that can be downloaded, installed, and executed. The computing device 470 can include memory resources 474, and the processing resources 472 can be coupled to the memory resources 474.

The CRI 480 can include a number of modules 482, 484, 486, 488. The number of modules 482, 484, 486, 488 can include CRI that when executed by the processing resources 472 can perform a number of functions.

The number of modules 482, 484, 486, 488 can be sub-modules of other modules. For example, an incorporating module 482 and the selecting module 484 can be sub-modules and/or contained within the same computing device (e.g., computing device 470). In another example, the number of modules 482, 484, 486, 488 can comprise individual modules on separate and distinct computing devices.

An incorporating module 482 can include CRI that when executed by the processing resources 472 can perform a number of incorporating functions. The incorporating module 482 can incorporate non-text time series data with articles from a first number of topics based on a time relationship. For example, non-text time series data can be incorporated with topic modeling to determine related topics that utilize a time relationship and word co-occurrences to find words within textual articles that have a causal relationship to numerical values of the non-text time series data.

A selecting module 484 can include CRI that when executed by the processing resources 472 can perform a number of selecting functions. The selecting module 484 can select a topic from the first number of topics based on a time relevancy of the non-text time series data. For example, the selecting module 484 can select a number of topics that have a relatively high causal relationship to the non-text time series data.

An analyzing module 486 can include CRI that when executed by the processing resources 472 can perform a number of analyzing functions. The analyzing module 486 can analyze the non-text time series data with a number of words within the topic to determine a causal relationship. For example, the analyzing module can determine a significance value for each word within the topic.

A separating module 488 can include CRI that when executed by the processing resources 472 can perform a number of separating functions. The separating module 488 can separate the number of words into a second number of topics based on the causal relationship. For example, the separating module 488 can separate the number of words into a number of topic priors (e.g., topic priors 162 as described in reference to FIG. 1).

A non-transitory MRM 478, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), etc., as well as other types of computer-readable media.

The non-transitory MRM 478 can be integral, or communicatively coupled, to a computing device, in a wired and/or a wireless manner. For example, the non-transitory MRM 478 can be an internal memory, a portable memory, a portable disk, or a memory associated with another computing resource (e.g., enabling CRIs to be transferred and/or executed across a network such as the Internet).

The MRM 478 can be in communication with the processing resources 472 via a communication path 476. The communication path 476 can be local or remote to a machine (e.g., a computer) associated with the processing resources 472. Examples of a local communication path 476 can include an electronic bus internal to a machine (e.g., a computer) where the MRM 478 is one of volatile, non-volatile, fixed, and/or removable storage medium in communication with the processing resources 472 via the electronic bus.

The communication path 476 can be such that the MRM 478 is remote from the processing resources (e.g., processing resource 472), such as in a network connection between the MRM 478 and the processing resources (e.g., processing resource 472). That is, the communication path 476 can be a network connection. Examples of such a network connection can include a local area network (LAN), wide area network (WAN), personal area network (PAN), and the Internet, among others. In such examples, the MRM 478 can be associated with a first computing device and the processing resources 472 can be associated with a second computing device (e.g., a Java® server). For example, a processing resource 472 can be in communication with a MRM 478, wherein the MRM 478 includes a set of instructions and wherein the processing resource 472 is designed to carry out the set of instructions.

The processing resources 472 coupled to the memory resources 474 can execute CRI 480 to incorporate non-text time series data with articles from a first number of topics based on a time relationship. The processing resources 472 coupled to the memory resources 474 can also execute CRI 480 to select a topic from the first number of topics based on a time relevancy of the non-text time series data. The processing resources 472 coupled to the memory resources 474 can also execute CRI 480 to analyze the non-text time series data with a number of words within the topic to determine a causal relationship. The processing resources 472 coupled to the memory resources 474 can also execute CRI 480 to separate the number of words into a second number of topics based on the causal relationship. Furthermore, the processing resources 472 coupled to the memory resources 474 can execute CRI 480 to utilize the number of words within the second number of topics for topic modeling of the articles.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for causal topic mining, comprising:
incorporating non-text time series data of a numerical value varying over time with a number of textual articles from a first number of topics based on a time relationship of the time series data and the timestamps;
selecting a topic from the first number of topics based on a time relevancy of the non-text time series data;
analyzing the non-text time series data with a number of words within the topic to determine a causal relationship between the non-text time series data and the number of words, the causal relationship between the time series data and the words being changes in the numerical value at times of the timestamps of one or more of the articles in which the words appear;
separating the number of words into a second number of topics based on the causal relationship, wherein separating the number of words includes determining an impact orientation for each of the number of words and separating the number of words based on the impact orientation to generate a number of topic priors, the impact orientation for each word being a positive orientation where the word corresponds to an increase in the numerical value of the time series data and being a negative orientation where the word corresponds to a decrease in the numerical value of the time series data; and
utilizing the number of words within the second number of topics for topic modeling of the articles.

2. The method of claim 1, further comprising determining by comparing a timeline of the time series data to a timestamp of the number of articles.

3. The method of claim 1, further comprising ranking the number of words within the number of articles based on the causal relationship between the time series data and the number of words.

4. The method of claim 1, further comprising determining an orientation type of the causal relationship within the number of articles that correspond to changes in the numerical values of the time series data.

5. The method of claim 1, further comprising selecting a word from the number articles based on the causal relationship.

6. The method of claim 5, further comprising refining the selected word with an additional iteration of topic modeling.

7. A non-transitory computer-readable medium storing a set of instructions executable by a processor to cause a computer to:
incorporate non-text time series data of a numerical value varying over time with a number of textual articles from a first number of topics based on a time relationship of the time series data and the timestamps;
select a topic from the first number of topics based on a time relevancy of the non-text time series data;
analyze the non-text time series data with a number of words within the topic to determine a causal relationship between the non-text time series data and the number of words, the causal relationship between the time series data and the words being changes in the numerical value at times of the timestamps of one or more of the articles in which the words appear;
separate the number of words into a second number of topics based on the causal relationship, wherein separating the number of words includes determining an impact orientation for each of the number of words and separating the number of words based on the impact orientation to generate a number of topic priors, the impact orientation for each word being a positive orientation where the word corresponds to an increase in the numerical value of the time series data and being a negative orientation where the word corresponds to a decrease in the numerical value of the time series data; and
utilize the number of words within the second number of topics for topic modeling of the articles.

8. The medium of claim 7, wherein the causal relationship indicates an increase of a numerical value within the non-text time series data.

9. The medium of claim 7, wherein the causal relationship indicates a decrease of a numerical value within the non-text time series data.

10. The medium of claim 7, wherein the topics comprise results from topic modeling of a number of articles.

11. The medium of claim 10, wherein the computer is to analyze the non-text time series data and a number of terms by comparing a timeline of the non-text time series data with a time stamp of the number of articles.

12. A system for causal topic mining, the system comprising a processing resource in communication with a non-transitory computer readable medium, wherein the non-transitory computer readable medium includes a set of instructions and wherein the processing resource is designed to execute the set of instructions to:
incorporate non-text time series data of a numerical value varying over time with a number of textual articles from a first number of topics based on a time relationship of the time series data and the timestamps;
select a topic from the first number of topics based on a time relevancy of the non-text time series data;
analyze the non-text time series data with a number of words within the topic to determine a causal relationship between the non-text time series data and the number of words, the causal relationship between the time series data and the words being changes in the numerical value at times of the timestamps of one or more of the articles in which the words appear;
separate the number of words into a second number of topics based on the causal relationship, wherein separating the number of words includes determining an impact orientation for each of the number of words and separating the number of words based on the impact orientation to generate a number of topic priors, the impact orientation for each word being a positive orientation where the word corresponds to an increase in the numerical value of the time series data and being a negative orientation where the word corresponds to a decrease in the numerical value of the time series data; and utilize the number of words within the second number of topics for topic modeling of the articles.

13. The computing system of claim 12, wherein the second number of topics are separated based on a significance value, wherein the significance value is based on a change in the numerical value of the non-text time series data.

14. The computing system of claim 12, wherein words within the second number of topics are ranked based on a probability value, wherein the probability value is a word occurrence that result in the particular orientation of the topic prior.

* * * * *